United States Patent
Lee et al.

(10) Patent No.: US 8,116,801 B2
(45) Date of Patent: *Feb. 14, 2012

(54) APPARATUS AND METHOD FOR CONTROLLING POWER IN A COMMUNICATION SYSTEM

(75) Inventors: Ik-Beom Lee, Seongnam-si (KR); Jae-Ho Jeon, Seongnam-si (KR); Seung-Joo Maeng, Seongnam-si (KR); Ha-Young Yang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1043 days.

This patent is subject to a terminal disclaimer.

(21) Appl. No.: 12/012,730

(22) Filed: Feb. 5, 2008

(65) Prior Publication Data
US 2008/0187071 A1    Aug. 7, 2008

(30) Foreign Application Priority Data

Feb. 5, 2007   (KR) .................. 10-2007-0011545
Feb. 22, 2007  (KR) .................. 10-2007-0017901

(51) Int. Cl.
*H04W 52/20* (2009.01)
*H04W 52/22* (2009.01)

(52) U.S. Cl. ........................ 455/522; 455/69

(58) Field of Classification Search ............... None
See application file for complete search history.

(56) References Cited

U.S. PATENT DOCUMENTS

| | | | | |
|---|---|---|---|---|
| 5,982,760 A | * | 11/1999 | Chen | 455/522 X |
| 6,137,840 A | * | 10/2000 | Tiedemann et al. | 455/522 X |
| 6,259,928 B1 | * | 7/2001 | Vembu | 455/522 |
| 7,912,005 B2 | * | 3/2011 | Lee et al. | 370/329 |
| 2002/0167907 A1 | | 11/2002 | Sarkar et al. | |
| 2005/0164646 A1 | | 7/2005 | Chen et al. | |
| 2006/0002346 A1 | | 1/2006 | Sutivong et al. | |

FOREIGN PATENT DOCUMENTS

KR   10-2006-0117116    11/2006

* cited by examiner

*Primary Examiner* — Philip Sobutka

(57) ABSTRACT

Provided is an outer loop power control apparatus and method for a signal transmitter in a communication system. The outer loop power control method includes determining a first setpoint of a $k^{th}$ frame according to whether or not an error occurs in a $(k-1)^{th}$ frame, updating a second setpoint of the $k^{th}$ frame with the first setpoint of the $k^{th}$ frame if a difference value between the first setpoint of the $k^{th}$ frame and a second setpoint of the $(k-1)^{th}$ frame is greater than a first reference value, and transmitting a transmit power control message to a signal receiver at the $k^{th}$ frame if the difference value between first setpoint of the $k^{th}$ frame and the second setpoint of the $(k-1)^{th}$ frame is greater than a second reference value.

22 Claims, 2 Drawing Sheets

APPARATUS AND METHOD FOR CONTROLLING POWER IN A COMMUNICATION SYSTEM

CROSS-REFERENCE TO RELATED APPLICATION(S) AND CLAIM OF PRIORITY

This application claims the benefit under 35 U.S.C. §119(a) of a Korean Patent Application filed in the Korean Intellectual Property Office on Feb. 5, 2007 and assigned. Serial No. 2007-11545 and a Korean Patent Application in the Korean Intellectual Property Office on Feb. 22, 2007 and assigned Serial No. 2007-17901, the entire disclosures of each of which are hereby incorporated by reference.

TECHNICAL FIELD OF THE INVENTION

The present invention relates to an apparatus and method for controlling power in a communication system, and in particular, to an outer loop power control apparatus and method.

BACKGROUND OF THE INVENTION

In next-generation communication systems, active research is being conducted to provide services with various Qualities-of-Services (QoSs) to users. A typical example of the next-generation communication systems is an Institute of the Electrical and Electronics Engineers (IEEE) 802.16 communication system.

The IEEE 802.16 communication system proposes to perform power control using various control schemes such as an open loop power control scheme, a closed loop power control scheme, and an outer loop power control scheme.

The open loop power control scheme, the closed loop power control scheme, and the outer loop power control scheme will be described below.

In the open loop power control scheme, a signal transmitter independently determines the channel state of a signal receiver and performs power control depending on the determined channel state. In other words, the open loop power control scheme controls power based on the reciprocity between an UpLink (UL) channel and a DownLink (DL) channel. For example, the signal transmitter may be a Base Station (BS) and the signal receiver may be a Mobile Station (MS). For convenience of the description, the terms 'BS' and 'MS' will be used in place of the signal transmitter and the signal receiver.

The term 'reciprocity between the UL channel and the DL channel' as used herein means that the UL channel and the DL channel experience similar path losses due to antenna gain based on an antenna pattern, a shading effect caused by geographical features, and multi-path fading, when the positions of MSs against a BS are the same. In other words, in the open loop power control scheme, the BS directly estimates the signal reception quality of an MS based on the reciprocity between the UL and DL channels to calculate required transmit power for signal transmission.

In the closed loop power control scheme, a BS controls the transmit power of an MS based on feedback information, i.e., channel information of the MS, received over a feedback channel from the MS.

In the closed loop power control scheme, the BS receives a pilot signal from the MS, measures a Carrier to Interference and Noise Ratio (CINR) using the received pilot signal, and compares the measured CINR with a predetermined threshold, i.e., a required CINR. If the CINR is less than the required CINR, the BS transmits to the MS a transmit power control message indicating the need for an increase in the transmit power. On the contrary, for the CINR greater than the required CINR, the BS transmits to the MS a transmit power control message indicating the need for a decrease in the transmit power.

The outer loop power control scheme, a scheme for controlling transmit power based on a desired particular performance index (e.g., a target Packet Error Rate (PER)) adaptively changes a power control reference (e.g., a required CINR) according to a channel state in order to keep the target PER constant. The PER indicates an error rate limit for a digital signal, which is required to provide high QoS. Thus, the PER is closely related to the degree of communication satisfaction of a user provided with a service.

As discussed above, power control schemes used for the general communication system include the open loop power control scheme, the closed loop power control scheme, and the outer loop power control scheme. The next-generation communication system performs power control by appropriately combining the open loop power control scheme, the closed loop power control scheme, and the outer loop power control scheme in order to provide services with various QoSs to users.

In the closed loop power control scheme, a BS transmits a transmit power control message to an MS. Upon receiving the transmit power control message, the MS processes the received transmit power control message. Due to the time required for the MS to receive and process the transmit power control message, an error may occur in transmit power, causing degradation in the benefits of power control.

The outer loop power control scheme manages a power control reference depending only on the Modulation and Coding Scheme (MCS) level regardless of the use of a Hybrid Automatic Retransmission reQuest (HARQ) scheme, making it difficult to reflect link performance for each MCS level based on the use and nonuse of the HARQ scheme. Thus, the BS may transmit a traffic burst with the power greater or less than required.

SUMMARY OF THE INVENTION

To address the above-discussed deficiencies of the prior art, it is a primary object of the present invention to address at least the above problems and/or disadvantages and to provide at least the advantages described below. Accordingly, an aspect of the present invention is to provide an outer loop power control apparatus and method for reflecting link performance for each MCS level based on the use and nonuse of a Hybrid Automatic Retransmission reQuest (HARQ) scheme in a communication system.

Another aspect of the present invention is to provide an apparatus and method in which a base station (BS) controls the transmit power of a mobile station (MS) using two setpoints newly suggested by the present invention in a communication system.

Another aspect of the present invention is to provide an apparatus and method in which a BS determines a setpoint, being set for outer loop power control, separately for each MCS level according the use and nonuse of an HARQ scheme in a communication system.

According to an aspect of the present invention, there is provided an outer loop power control method for a signal transmitter in a communication system. The outer loop power control method includes determining a first setpoint of a $k^{th}$ frame according to whether or not an error occurs in a $(k-1)^{th}$ frame, updating a second setpoint of the $k^{th}$ frame with the first setpoint of the $k^{th}$ frame if a difference value between the first setpoint of the $k^{th}$ frame and a second setpoint of the $(k-1)^{th}$ frame is greater than a first reference value, and transmitting a transmit power control message to a signal receiver at the $k^{th}$ frame if the difference value between first setpoint of the $k^{th}$ frame and the second setpoint of the $(k-1)^{th}$ frame is greater than a second reference value.

According to another aspect of the present invention, there is provided an outer loop power control apparatus in a communication system. The outer loop power control apparatus includes a signal transmitter for determining a first setpoint of a $k^{th}$ frame according to whether or not an error occurs in a $(k-1)^{th}$ frame, updating a second setpoint of the $k^{th}$ frame with the first setpoint of the $k^{th}$ frame if a difference value between the first setpoint of the $k^{th}$ frame and a second setpoint of the $(k-1)^{th}$ frame is greater than a first reference value, and transmitting a transmit power control message to a signal receiver at the $k^{th}$ frame if the difference value between first setpoint of the $k^{th}$ frame and the second setpoint of the $(k-1)^{th}$ frame is greater than a second reference value.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
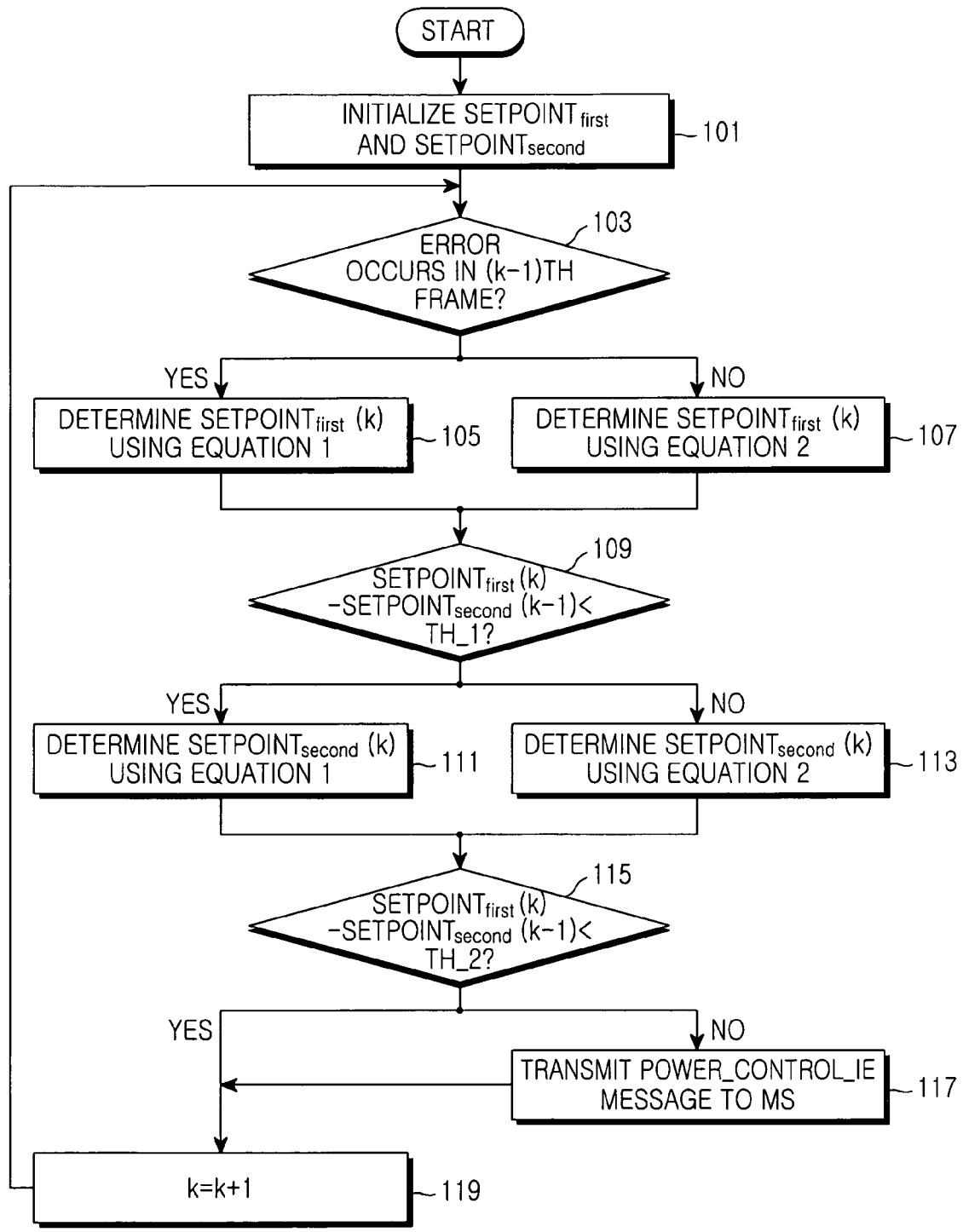
FIG. 1 is a flowchart illustrating a process in which a BS transmits a power_control_IE message to an MS in a communication system according to the present invention.

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

The present invention provides a power control apparatus and method capable of accurately performing power control in a communication system. To this end, the present invention uses both an existing open loop power control scheme and a newly suggested outer loop power control scheme, thereby facilitating accurate and efficient power control.

The newly suggested outer loop power control scheme can be applied to any communication system, and preferably, to communication systems using orthogonal frequencies.

In the newly suggested outer loop power control scheme, a signal transmitter, e.g., a Base Station (BS), manages 2 setpoints. In an embodiment of the present invention described below, the 2 setpoints will be referred to as a first setpoint ($Setpoint_{first}$) and a second setpoint ($Setpoint_{second}$). The term 'setpoint' as used herein means a Carrier to Interference and Noise Ratio (CINR) required by the BS.

The $Setpoint_{first}$ can be divided into a one for a case where an error occurs in a frame and another one for a case where no error occurs in a frame. The former $Setpoint_{first}$ can be expressed as follows:

$$Setpoint_{first}(k) = Setpoint_{first}(k-1) + \delta. \qquad [\text{Eqn. 1}]$$

The latter $Setpoint_{first}$ can be expressed as follows:

$$Setpoint_{first}(k) = Setpoint_{first}(k-1) - \delta * \frac{PER_{Target}}{1 - PER_{Target}}. \qquad [\text{Eqn. 2}]$$

In Equations 1 and 2, $Setpoint_{first}(k)$ indicates a CINR required in a current frame or a $k^{th}$ frame, $Setpoint_{first}(k-1)$ indicates a CINR required in a previous frame or a $(k-1)^{th}$ frame, $\delta$ indicates an offset expressed as an arbitrary constant that is previously set in system implementation, and $PER_{Target}$ indicates a target Packet Error Rate (PER).

In other words, when an error occurs in the previous frame, the BS determines the required CINR of the current frame as a value calculated by adding a predetermined offset to the required CINR of the previous frame. Thus, the required CINR of the current frame is higher than that for the previous frame, thereby preventing error occurrence.

On the other hand, when no error occurs in the previous frame, the BS determines the required CINR of the current frame taking into account the required CINR of the previous frame and the target PER. Thus, the required CINR of the current frame is lower than that for the previous frame, thereby allowing the efficient use of the remaining resources.

The BS compares a difference value between $Setpoint_{first}(k)$ and $Setpoint_{second}(k-1)$ with a predetermined first reference value (or threshold) Th_1 and determines $Setpoint_{second}(k)$ required in the current frame according to the comparison result. $Setpoint_{second}(k)$ can be expressed as follows:

$$Setpoint_{second}(k) = Setpoint_{second}(k-1), \text{ if } Setpoint_{first}(k) - Setpoint_{second}(k-1) < Th\_1. \qquad [\text{Eqn. 3}]$$

$$Setpoint_{second}(k) = Setpoint_{first}(k), \text{ if } Setpoint_{first}(k) - SetPoint_{second}(k-1) \geq Th\_1. \qquad [\text{Eqn. 4}]$$

where $Setpoint_{first}(k)$ indicates $Setpoint_{first}$ of a current frame or a $k^{th}$ frame, $Setpoint_{first}(k-1)$ indicates $Setpoint_{first}$ of a previous frame or a $(k-1)^{th}$ frame, $Setpoint_{second}(k)$ indicates $Setpoint_{second}$ of the $k^{th}$ frame, $Setpoint_{second}(k-1)$ indicates $Setpoint_{second}$ of the $(k-1)^{th}$ frame, and Th_1 indicates a first reference value predetermined for determining $Setpoint_{second}$ of the $k^{th}$ frame.

In other words, when the difference value between $Setpoint_{first}(k)$ and $Setpoint_{second}(k-1)$ is less than Th_1, $Setpoint_{second}(k)$ is the same as $Setpoint_{second}(k-1)$. On the other hand, when the difference value is greater than or equal to Th_1, $Setpoint_{second}(k)$ is updated with a required CINR, i.e., $Setpoint_{first}(k)$, of the same frame.

The BS compares the difference value between Setpoint$_{first}$(k) and Setpoint$_{second}$(k−1) with a predetermined second reference value Th_2 and determines whether to transmit a transmit power control message, i.e., a power_control_IE message, at the current frame or the k$^{th}$ frame, according to the comparison result. Whether to transmit the power_control_IE message can be determined as follows:

$$k=k+1 \text{ if Setpoint}_{first}(k)-\text{Setpoint}_{second}(k-1)<Th\_2.$$ [Eqn. 5]

Transmit power_control_IE message in k$^{th}$ frame if
$$\text{Setpoint}_{first}(k)-\text{Setpoint}_{second}(k-1) \geq Th\_2.$$ [Eqn. 6]

where k indicates the current frame or the k$^{th}$ frame, (k+1) indicates a next frame or a (k+1)$^{th}$ frame, and Th_2 indicates a second reference value predetermined for transmitting the power_control_IE message.

In other words, when the difference value between Setpoint$_{first}$(k) and Setpoint$_{second}$(k−1) is less than Th_2, the BS proceeds to the (k+1)$^{th}$ frame. When the difference value between Setpoint$_{first}$(k) and Setpoint$_{second}$(k−1) is greater than or equal to Th_2, the BS transmits the power_control_IE message to a signal receiver, e.g., a Mobile Station (MS) at the k$^{th}$ frame in order to control the transmit power of the MS.

A description will now be given of the Setpoint$_{first}$ and Setpoint$_{second}$ for each frame based on whether or not an error occurs in a frame of a traffic burst.

The Setpoint$_{first}$ and Setpoint$_{second}$ for each frame can be expressed as shown in Table 1. In an exemplary case of Table 1, initial values of Setpoint$_{first}$ and Setpoint$_{second}$ are '0', δ is '1', the target PER is '0.1 (10%)', and Th_1 and Th_2 are '3'.

TABLE 1

| | Frame | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 |
| | Good | Err | Good | Err | Err | Good | Good | Good | Good | Good | Good | Good | Err | Good | Good | Good | Good | Good | Good | Good |
| Setpoint$_{first}$ | 0 | −1/9 | 8/9 | 7/9 | 16/9 | 25/9 | 24/9 | 23/9 | 22/9 | 21/9 | 20/9 | 19/9 | 2 | 3 | 26/9 | 25/9 | 24/9 | 23/9 | 22/9 | 21/9 |
| Setpoint$_{second}$ | 0 | 0 | 0 | 0 | 0 | 0 | 0 | 0 | 0 | 0 | 0 | 0 | 0 | 3 | 3 | 3 | 3 | 3 | 3 | 3 |

In Table 1, since an error occurs in a 12$^{th}$ frame, a Setpoint$_{first}$ of a 13$^{th}$ frame is determined taking into account a Setpoint$_{first}$=2 of the 12$^{th}$ frame, the predetermined offset δ(=1), and the target PER (=0.1) in accordance with Equation 1. Thus, the Setpoint$_{first}$ of the 13$^{th}$ frame is 3.

The BS then compares a difference value, 3−0=3, between the Setpoint$_{first}$=3 of the 13$^{th}$ frame and a Setpoint$_{second}$=0 of the 12$^{th}$ frame, with the Th_1=3. Since the comparison result satisfies a condition of Equation 4, the BS updates a Setpoint$_{second}$ of the 13$^{th}$ frame with the Setpoint$_{first}$=3 of the 13$^{th}$ frame according to Equation 4.

The BS also compares the difference value, 3−0=3, between the Setpoint$_{first}$=3 of the 13$^{th}$ frame and the Setpoint$_{second}$=0 of the 12$^{th}$ frame, with the Th_2=3. Since the comparison result satisfies a condition of Equation 6, the BS transmits the power_control_IE message to the MS at the 13$^{th}$ frame.

Although the Th_1 and Th_2 are assumed to be 3 in Table 1, they are subject to change and can also be either equal to or different from each other.

FIG. 1 is a flowchart illustrating a process in which a BS transmits a power_control_IE message to an MS in a communication system according to the present invention.

Referring to FIG. 1, the BS initializes a Setpoint$_{first}$ and a Setpoint$_{second}$ to the same value in step 101. In step 103, the BS checks if an error occurs in a previous frame or a (k−1)$^{th}$ frame. If so, the BS determines in step 105 a Setpoint$_{first}$ of a current frame or a k$^{th}$ frame, in accordance with Equation 1, and then proceeds to step 109.

If it is checked in step 103 that no error occurs in the (k−1)$^{th}$ frame, the BS goes to step 107 where it determines the Setpoint$_{first}$ of the k$^{th}$ frame according to Equation 2, and then goes to step 109.

In step 109, the BS checks if a difference value between the Setpoint$_{first}$ of the k$^{th}$ frame and a Setpoint$_{second}$ of the (k−1)$^{th}$ frame is less than a Th_1. If so, the BS goes to step 111 where it determines a Setpoint$_{second}$ of the k$^{th}$ frame in accordance with Equation 3, and then goes to step 115.

If it is checked in step 109 that the difference value is greater than or equal to the Th_1, the BS goes to step 113 where it determines the Setpoint$_{second}$ of the k$^{th}$ frame in accordance with Equation 4, and then goes to step 115.

In step 115, the BS checks if the difference value between the Setpoint$_{first}$ of the k$^{th}$ frame and the Setpoint$_{second}$ of the (k−1)$^{th}$ frame is less than a Th_2. If so, the BS goes to step 119 where it proceeds to a next frame or a (k+1)$^{th}$ frame according to Equation 5, and then goes to step 103.

If it is checked in step 115 that the difference value is greater than or equal to the Th_2, the BS goes to step 117 where it transmits a transmit power control message, i.e., the power_control_IE message, to an MS at the k$^{th}$ frame according to Equation 6, and then goes to step 119.

Hitherto, a description has been given of the method in which the BS controls the transmit power of the MS using the newly suggested 2 setpoints Setpoint$_{first}$ and Setpoint$_{second}$.

With reference to various embodiments of the present invention, a description will now be made of a method in which a BS determines a setpoint being set for outer loop power control for a traffic burst of an MS during the transmission of the traffic burst.

In the outer loop power control scheme, when an initial value of a setpoint, which is first set for maintaining a target PER constant, is assumed to be a 'reference setpoint', either the previously set setpoint or a setpoint newly set by giving a new offset to the reference setpoint may be used as the reference setpoint in order to maintain the target PER, which changes depending on the channel state, constant.

The reference setpoint is subject to change according to an MCS level and/or the use and nonuse of a Hybrid Automatic Retransmission reQuest (HARQ) scheme. The phrase 'use and nonuse of the HARQ scheme' as used herein means that whether or not a corresponding traffic burst uses the HARQ scheme. Traffic bursts can be classified into those that use the HARQ scheme and those that do not use the HARQ scheme. In an embodiment of the present invention described below, a traffic burst using the HARQ scheme is defined as a 'HARQ MAP-applied traffic burst' and a traffic burst that does not use the HARQ scheme is defined as a 'normal MAP-applied traffic burst'.

When the MS is assumed to transmit a traffic burst with a particular MCS level through an UpLink (UL), the BS sets a reference setpoint of the traffic burst according to the MCS level as follow.

TABLE 2

| MCS level | Reference setpoint |
|---|---|
| 1 | ST_MCS_1 |
| 2 | ST_MCS_2 |
| 3 | ST_MCS_3 |
| 4 | ST_MCS_4 |

When the outer loop power control scheme is used, a reference setpoint associated with the MCS level as shown in Table 2 is changed adaptively according to a channel state. For example, the reference setpoint is adaptively changed according to a good channel state and a poor channel state. For example, the good channel state corresponds to a case where no error occurs in a frame and the poor channel state corresponds to a case where an error occurs in a frame.

A setpoint corresponding to the case where no error occurs in a frame can be expressed as follows:

$$Setpoint = Setpoint - \Delta * \frac{PER_{Target}}{1 - PER_{Target}}. \quad [\text{Eqn. 7}]$$

A setpoint corresponding to the case where an error occurs in a frame can be expressed as follows:

$$Setpoint = Setpoint + \Delta. \quad [\text{Eqn. 8}]$$

In Equations 7 and 8, $\Delta$ indicates an offset expressed as an arbitrary constant that is previously set in system implementation and $PER_{Target}$ indicates a target PER.

If the channel state is changed, a scheduler of the BS changes an MCS level to be applied to a traffic burst of the MS according to the changed channel state and changes the setpoint according to the changed MCS level.

A description will now be made of a method for determining a setpoint for a case where an MCS level applied to a traffic burst changes from an MCS level A to an MCS level B by way of example A method for determining a setpoint in response to a change in the MCS level can be expressed as follows:

$$Setpoint_{new} = Setpoint_{old} + ST\_MCS\_B - ST\_MCS\_A + \Delta, \quad [\text{Eqn. 9}]$$

where $Setpoint_{new}$ indicates a new setpoint after a change in the MCS level applied to a traffic burst, i.e., a change from the MCS level A to the MCS level B, $Setpoint_{old}$ indicates an old setpoint before the change in the MCS level, i.e., a setpoint corresponding to the MCS level A, ST_MCS_B indicates a reference setpoint that is set when the MCS level is the MCS level B, ST_MCS_A indicates a reference setpoint that is set when the MCS level is the MCS level A, and $\Delta$ indicates an offset expressed as an arbitrary constant that is previously set in system implementation.

The reference setpoints in Table 2 are set such that link performance can satisfy a target PER. The target PER for a case where the HARQ scheme is used, differs from the target PER for a case where the HARQ scheme is not used. In other words, a target PER of a traffic burst to which the HARQ MAP is applied and a target PER of a traffic burst to which a normal MAP is applied a are different from each other. More specifically, since the traffic burst to which the HARQ MAP is applied can be retransmitted, its target PER has to be set higher than that of the traffic burst to which the normal MAP is applied for initial transmission.

For example, when an HARQ MAP-applied traffic burst with the target PER=10% and a normal MAP-applied traffic burst with the target PER=1% coexist, a reference setpoint can be set according to an MCS level as follows.

TABLE 3

| | Reference setpoint | |
|---|---|---|
| MCS level | Normal MAP | HARQ MAP |
| 1 | ST_N_MCS_1 | ST_H_MCS_1 |
| 2 | ST_N_MCS_2 | ST_H_MCS_2 |
| 3 | ST_N_MCS_3 | ST_H_MCS_3 |
| 4 | ST_N_MCS_4 | ST_H_MCS_4 |

Table 3 shows the reference setpoints for a case where traffic bursts to which the normal MAP is applied use their own same target PER and traffic bursts to which the HARQ MAP is applied also use their own same target PER.

However, if some of the traffic bursts to which the normal MAP is applied use different target PERs or some of the traffic bursts to which the HARQ MAP is applied use different target PERs, the number of reference setpoints would increase with the number of target PERs used.

Table 4 shows reference setpoints for a case where 2 of the traffic bursts to which the HARQ MAP is applied use different target PERs and all the traffic bursts to which the normal MAP is applied use the same target PER.

TABLE 4

| | Reference setpoint | | |
|---|---|---|---|
| MCS level | Normal MAP | HARQ MAP (Target PER_A) | HARQ MAP (Target PER_B) |
| 1 | ST_N_MCS_1 | ST_H_MCS_1_TP_A_1 | ST_H_MCS_1_TP_B_1 |
| 2 | ST_N_MCS_2 | ST_H_MCS_1_TP_A_2 | ST_H_MCS_1_TP_B_2 |
| 3 | ST_N_MCS_3 | ST_H_MCS_1_TP_A_3 | ST_H_MCS_1_TP_B_3 |
| 4 | ST_N_MCS_4 | ST_H_MCS_1_TP_A_4 | ST_H_MCS_1_TP_B_4 |

As can be seen from Table 4, the number of reference setpoints for each MCS level increases with the number of traffic bursts using different target PERs.

Next, a description will be given of a method for determining a setpoint for the case where there is a change in a MAP type and an MCS level applied to a traffic burst, e.g., for the case where transmission of a traffic burst to which the HARQ MAP and the MCS level A are applied is completed and transmission of a traffic burst to which the normal MAP and the MCS level B are applied is initiated in the same MS. The method for determining the setpoint can be expressed as follows:

$$Setpoint_{new} = Setpoint_{old} + ST\_N\_MCS\_B - ST\_H\_MCS\_A + \Delta, \quad [\text{Eqn. 10}]$$

where Setpoint$_{new}$ indicates a new setpoint after a change in a MAP type and an MCS level both applied to a corresponding traffic burst, Setpoint$_{old}$ indicates an old setpoint before the change in the MAP type and the MCS level, ST_N_MCS_B indicates a reference setpoint of a traffic burst to which the normal MAP and the MCS level B are applied, ST_H_MCS_A indicates a reference setpoint of a traffic burst to which the HARQ MAP and the MCS level A are applied, and Δ0 indicates an offset expressed as an arbitrary constant that is previously set in system implementation.

Next, a description will be given of a method for determining a setpoint for the case where there is a change in a MAP type and an MCS level applied to a traffic burst, e.g., for the case where transmission of the traffic burst to which the normal MAP and the MCS level B are applied is completed and transmission of the traffic burst to which the HARQ MAP and the MCS level A are applied is initiated in the same MS. The method for determining the setpoint can be expressed as follows:

$$\text{Setpoint}_{new}=\text{Setpoint}_{old}+ST\_H\_MCS\_A-ST\_N\_MCS\_B+\Delta, \quad [\text{Eqn. 11}]$$

where Setpoint$_{new}$ indicates a new setpoint after a change in a MAP type and an MCS level both applied to a corresponding traffic burst, Setpoint$_{old}$ indicates an old setpoint before the change in the MAP type and the MCS level, ST_H_MCS_A indicates a reference setpoint of a traffic burst to which the HARQ MAP and the MCS level A are applied, ST_N_MCS_B indicates a reference setpoint of a traffic burst to which the normal MAP and the MCS level B are applied, and Δ indicates an offset expressed as an arbitrary constant that is previously set in system implementation.

Figure 2:
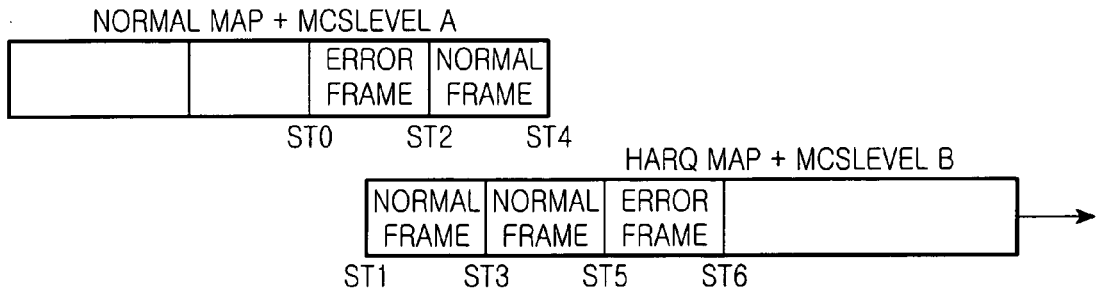
FIG. 2 illustrates a traffic burst in a communication system according to a first embodiment of the present invention.

With reference to FIG. 2, a description will be made of a method for determining a setpoint for a case where transmission of a traffic burst to which the HARQ MAP and the MCS level B are applied is initiated during transmission of a traffic burst to which the normal MAP and the MCS level A are applied in the same MS.

The method for determining the setpoint can be expressed as follows:

$$ST1=ST0+ST\_H\_MCS\_B-ST\_N\_MCS\_A+\Delta ST2=ST1+ST\_N\_MCS\_A-ST\_H\_MCS\_B+\Delta\_N, ST6=ST5+\Delta\_H \quad [\text{Eqn. 12}]$$

where ST0 indicates a setpoint at a time point ST0 illustrated in FIG. 2, ST_H_MCS_B indicates a reference setpoint of a traffic burst to which the HARQ MAP and the MCS level B are applied, ST_N_MCS_A indicates a reference setpoint of a traffic burst to which the normal MAP and the MCS level A are applied, Δ_N indicates an offset applied to a reference setpoint of a traffic burst to which the normal MAP is applied, Δ_H indicates an offset applied to a reference setpoint of a traffic burst to which the HARQ MAP is applied, and Δ indicates an offset expressed as an arbitrary constant that is previously set in system implementation.

Figure 3:
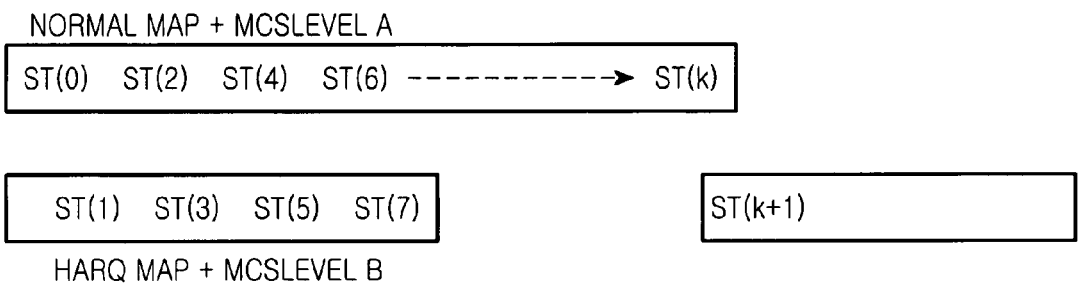
FIG. 3 illustrates a traffic burst in a communication system according to a second embodiment of the present invention.

Next, with reference to FIG. 3, on the assumption that a traffic burst to which the normal MAP and the MCS level A are applied and a traffic burst to which the HARQ MAP and the MCS level B are applied coexist in the same MS, a description will be made of a method for determining a setpoint for the case where transmission of one of the two traffic bursts is resumed after a pause. Here, the traffic burst whose transmission is resumed after a paused is assumed to be a traffic burst to which the HARQ MAP and the MCS level B are applied.

thus, a method for determining a setpoint at a time point at which transmission of the traffic burst to which the HARQ MAP and the MCS level B are applied is resumed, i.e., a setpoint ST(k+1) at a time point (k+1) illustrated in FIG. 3, can be expressed as follows:

$$ST(k+1)=ST(k)+ST\_H\_MCS\_B-ST\_N\_MCS\_A+\Delta \quad [\text{Eqn. 13}]$$

where ST(k+1) indicates a setpoint at the time point (k+1) illustrated in FIG. 3, ST_H_MCS_B indicates a reference setpoint of a traffic burst to which the HARQ MAP and the MCS level B are applied, ST_N_MCS_A indicates a reference setpoint of a traffic burst to which the normal MAP and the MCS level A are applied, and Δ indicates an offset expressed as an arbitrary constant that is previously set in system implementation.

Figure 4:
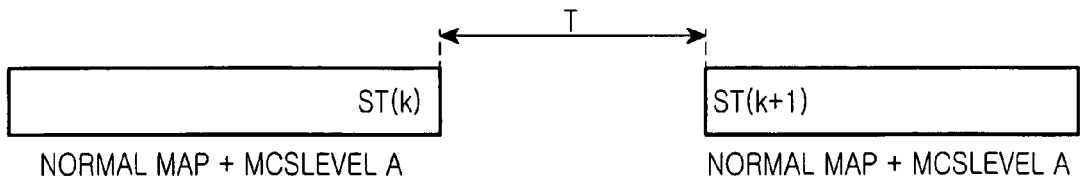
FIG. 4 illustrates a traffic burst in a communication system according to a third embodiment of the present invention.

With reference to FIG. 4, a description will be made of a method for determining a setpoint for the case where transmission of a traffic burst to which the normal MAP and the MCS level A are applied is resumed after paused for a predetermined time T in the same MS.

A method for determining a setpoint at a time point at which transmission of the traffic burst to which the normal MAP and the MCS level A are applied is resumed, i.e., a setpoint ST(k+1) at a time point (k+1) illustrated in FIG. 4, can be expressed as follows:

$$T>\text{Time\_Duration\_}TH; ST(k+1)=ST\_N\_MCS\_A$$
$$T<\text{Time\_Duration\_}TH; ST(k+1)=ST(k) \quad [\text{Eqn. 14}]$$

where T indicates the amount of time required to resume transmission of a traffic burst to which the normal MAP and the MCS level A are applied after a pause, and Time_Duration_TH indicates a threshold that can be set variably according to an estimate of the moving velocity of an MS. In other words, Time_Duration_TH decreases as the moving velocity of the MS increases and Time_Duration_TH increases as the moving velocity of the MS decreases.

Thus, ST(k+1) is equal to a setpoint of the traffic burst to which the normal MAP and the MCS level A are applied for T>Time_Duration_TH, and ST(k+1) is equal to ST(k) for T<Time_Duration_TH.

As is apparent from the foregoing description, the combined use of the open loop power control scheme and the newly suggested outer loop power control scheme facilitates efficient power control and contributes to an improvement in UL performance. Moreover, a reference setpoint of a traffic burst for each MCS level is set based on whether or not the HARQ scheme is applied to the traffic burst, thereby ensuring accurate reflection of MCS link performance in performing outer loop power control.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An outer loop power control method for a signal transmitter in a communication system, the method comprising:
    determining a first setpoint of a $k^{th}$ frame according to whether or not an error occurs in a $(k-1)^{th}$ frame;
    updating a second setpoint of the $k^{th}$ frame with the first setpoint of the $k^{th}$ frame if a difference value between the first setpoint of the $k^{th}$ frame and a second setpoint of the $(k-1)^{th}$ frame is greater than a first reference value; and
    transmitting a transmit power control message to a signal receiver at the $k^{th}$ frame if the difference value between first setpoint of the $k^{th}$ frame and the second setpoint of the $(k-1)^{th}$ frame is greater than a second reference value.

2. The outer loop power control method of claim 1, wherein the step of determining the first setpoint comprises:
   if the error occurs in the $(k-1)^{th}$ frame, determining the first setpoint of the $k^{th}$ frame as follows:

$$Setpoint_{first}(k) = Setpoint_{first}(k-1) + \delta,$$

where $Setpoint_{first}(k)$ indicates a required Carrier to Interference and Noise Ratio (CINR) of the $k^{th}$ frame, $Setpoint_{first}(k-1)$ indicates a required CINR of the $(k-1)^{th}$ frame, and $\delta$ indicates an offset expressed as an arbitrary constant that is previously set.

3. The outer loop power control method of claim 1, wherein the step of determining the first setpoint comprises:
   if the error does not occur in the $(k-1)^{th}$ frame, determining the first setpoint of the $k^{th}$ frame as follows:

$$Setpoint_{first}(k) = Setpoint_{first}(k-1) - \delta * \frac{PER_{Target}}{1 - PER_{Target}},$$

where $Setpoint_{first}(k-1)$ indicates a required Carrier to Interference and Noise Ratio (CINR) of the $k^{th}$ frame, $Setpoint_{first}(k-1)$ indicates a required CINR of the $(k-1)^{th}$ frame, $\delta$ indicates an offset expressed as an arbitrary constant that is previously set, and $PER_{Target}$ indicates a target Packet Error Rate (PER).

4. The outer loop power control method of claim 1, further comprising:
   updating the second setpoint of the $k^{th}$ frame with the second setpoint of the $(k-1)^{th}$ frame if the difference value between the first setpoint of the $k^{th}$ frame and the second setpoint of the $(k-1)^{th}$ frame is less than the first reference value.

5. The outer loop power control method of claim 1, further comprising:
   determining a first setpoint and a second setpoint of a $(k+1)^{th}$ frame if the difference value between the first setpoint of the $k^{th}$ frame and the second setpoint of the $(k-1)^{th}$ frame is less than the second reference value.

6. The outer loop power control method of claim 1, wherein an initial value of the first setpoint and an initial value of the second setpoint are set to a same value.

7. The outer loop power control method of claim 1, wherein the first reference value and the second reference value are set to either a same value or different values.

8. The outer loop power control method of claim 1, wherein the first setpoint is a Carrier to Interference and Noise Ratio (CINR) required by the signal transmitter.

9. The outer loop power control method of claim 8, wherein the first setpoint is determined according to whether or not a Hybrid Automatic Retransmission reQuest (HARQ) scheme is used and according to a Modulation and Coding Scheme (MCS) level.

10. The outer loop power control method of claim 9, wherein the first setpoint is determined according to a target Packet Error Rate (PER) if the HARQ scheme is used.

11. An outer loop power control apparatus in a communication system, the apparatus comprising:
   a signal transmitter for determining a first setpoint of a $k^{th}$ frame according to whether or not an error occurs in a $(k-1)^{th}$ frame, updating a second setpoint of the $k^{th}$ frame with the first setpoint of the $k^{th}$ frame if a difference value between the first setpoint of the $k^{th}$ frame and a second setpoint of the $(k-1)^{th}$ frame is greater than a first reference value, and transmitting a transmit power control message to a signal receiver at the $k^{th}$ frame if the difference value between first setpoint of the $k^{th}$ frame and the second setpoint of the $(k-1)^{th}$ frame is greater than a second reference value.

12. The outer loop power control apparatus of claim 11, wherein if the error occurs in the $(k-1)^{t}$ frame, the signal transmitter determines the first setpoint of the $k^{th}$ frame as follows:

$$Setpoint_{first}(k) = Setpoint_{first}(k-1) + \delta,$$

where $Setpoint_{first}(k)$ indicates a required Carrier to Interference and Noise Ratio (CINR) of the $k^{th}$ frame, $Setpoint_{first}(k-1)$ indicates a required CINR of the $(k-1)^{th}$ frame, and $\delta$ indicates an offset expressed as an arbitrary constant that is previously set.

13. The outer loop power control apparatus of claim 11, wherein if the error does not occur in the $(k-1)^{th}$ frame, the signal transmitter determines the first setpoint of the $k^{th}$ frame as follows:

$$Setpoint_{first}(k) = Setpoint_{first}(k-1) - \delta * \frac{PER_{Target}}{1 - PER_{Target}},$$

where $Setpoint_{first}(k)$ indicates a required Carrier to Interference and Noise Ratio (CINR) of the $k^{th}$ frame, $Setpoint_{first}(k-1)$ indicates a required CINR of the $(k-1)^{th}$ frame, $\delta$ indicates an offset expressed as an arbitrary constant that is previously set, and $PER_{Target}$ indicates a target Packet Error Rate (PER).

14. The outer loop power control apparatus of claim 11, wherein the signal transmitter updates the second setpoint of the $k^{th}$ frame with the second setpoint of the $(k-1)^{th}$ frame if the difference value between the first setpoint of the $k^{th}$ frame and the second setpoint of the $(k-1)^{th}$ frame is less than the first reference value.

15. The outer loop power control apparatus of claim 11, wherein the signal transmitter determines a first setpoint and a second setpoint of a $(k+1)^{th}$ frame if the difference value between the first setpoint of the $k^{th}$ frame and the second setpoint of the $(k-1)^{th}$ frame is less than the second reference value.

16. The outer loop power control apparatus of claim 11, wherein an initial value of the first setpoint and an initial value of the second setpoint are set to a same value.

17. The outer loop power control apparatus of claim 11, wherein the first reference value and the second reference value are set to either a same value or different values.

18. The outer loop power control apparatus of claim 11, wherein the first setpoint is a Carrier to Interference and Noise Ratio (CINR) required by the signal transmitter.

19. The outer loop power control apparatus of claim 18, wherein the first setpoint is determined according to whether or not a Hybrid Automatic Retransmission reQuest (HARQ) scheme is used and according to a Modulation and Coding Scheme (MCS) level.

20. The outer loop power control apparatus of claim 19, wherein the first setpoint is determined according to a target Packet Error Rate (PER) if the HARQ scheme is used.

21. An outer loop power control method for a signal transmitter in a communication system, the method comprising:
   setting a first reference setpoint of a traffic burst for which a Hybrid Automatic Retransmission reQuest (HARQ) scheme is used;
   setting a second reference setpoint of a traffic burst for which the HARQ scheme is not used; and performing power control according to the set first reference setpoint and second reference setpoint, wherein the first reference setpoint and the second reference setpoint are set according to whether or not the HARQ scheme is used and according to a Modulation and Coding Scheme (MCS) level.

22. An outer loop power control apparatus in a communication system, the apparatus comprising:

a signal transmitter for setting a first reference setpoint of a traffic burst for which a Hybrid Automatic Retransmission reQuest (HARQ) scheme is used, setting a second reference setpoint of a traffic burst for which the HARQ scheme is not used, and performing power control according to the set first reference setpoint and second reference setpoint, wherein the first reference setpoint and the second reference setpoint are set according to whether or not the HARQ scheme is used and according to a Modulation and Coding Scheme (MCS) level.

\* \* \* \* \*